(12) United States Patent
De' Longhi

(10) Patent No.: US 6,370,902 B1
(45) Date of Patent: Apr. 16, 2002

(54) APPARATUS FOR DEHUMIDIFYING AIR

(75) Inventor: Giuseppe De' Longhi, Treviso (IT)

(73) Assignee: De' Longhi S.p.A., Treviso (IT)

( * ) Notice: Subject to any disclaimer, the term of this patent is extended or adjusted under 35 U.S.C. 154(b) by 0 days.

(21) Appl. No.: 09/469,632

(22) Filed: Dec. 22, 1999

(30) Foreign Application Priority Data

Dec. 23, 1998 (IT) .......................................... MI98A2794

(51) Int. Cl.[7] .............................................. F25D 21/14
(52) U.S. Cl. .......................................... 62/288; 62/291
(58) Field of Search ........................... 62/288, 290, 291

(56) References Cited

U.S. PATENT DOCUMENTS 3,653,182 A * 4/1972 Weltch ........................ 261/116
5,669,221 A * 9/1997 LeBleu et al. ................ 62/228

* cited by examiner

Primary Examiner—William E. Tapolcai
Assistant Examiner—Mohammad M Ali
(74) Attorney, Agent, or Firm—Herbert Dubno

(57) ABSTRACT

An apparatus for dehumidifying air with a frame supporting a dehumidifying device for dehumidifying air and a collector for collecting condensate generated while dehumidifying the air, the collector has a discharge unit for discharging the condensate outside the frame at a level at least higher than the height of the collector.

12 Claims, 3 Drawing Sheets

APPARATUS FOR DEHUMIDIFYING AIR

BACKGROUND OF THE INVENTION

1. Field of the Invention

The present invention relates to an apparatus for dehumidify air.

2. Description of the Prior Art

Dehumidifiers are used to lower the relative humidity of rooms.

Where the relative humidity is particularly high, the dehumidification of air produces a great amount of condensate.

For the above reason, the dehumidifiers are provided with a tank, sometimes having a great capacity, adapted to collect the condensate generated by the operation of the dehumidifier.

The tanks are filled up in a more or less short period and must be emptied to prevent the condensate from spilling off in the room where the dehumidifiers are operating.

For the above reason, some of the dehumidifiers are provided with safety means adapted to stop the operation of the dehumidifier when the condensate reaches a maximum level in the collecting tank.

It is easily understood from the above, that conventional dehumidifier can operate only for a limited period of time because they are automatically deactivated each time the condensate reaches the preset level in the tank, thereby interrupting the dehumidifying operation.

If a continuous operation of the dehumidifier is required, it is necessary to keep a constant watch on the dehumidifier and on condensate level in the tank, with all the related inconveniences.

An aim of the present invention is to eliminate the inconveniences of the cited prior art.

A further aim is to provide an apparatus for dehumidifying air adapted to operate in continuous, regardless of the amount of condensate produced while dehumidifying the air and with absolute reliability of operation.

Still a further aim is to provide an apparatus for dehumidifying air having a high flexibility of use and that can be used in any type of ambient, underground, at ground level and upstairs in absolute safety and for any time period.

Still a further aim is to provide an apparatus for dehumidifying air having several and substantial advantages over the prior art dehumidifiers and still having a reduced size and cost, thereby helping its propagation among the customers.

SUMMARY OF THE INVENTION

The above aims, and other aims that will become apparent to those skilled in the art, are achieved by an apparatus for dehumidifying air comprising a frame supporting dehumidifying means for dehumidify air and collecting means for collecting condensate generated while dehumidifying the air, characterized in that said collecting means comprises at least one discharge means for discharging said condensate outside said frame.

Further characteristics and advantages of the invention will become apparent from a reading of the detailed description of a preferred but not exclusive embodiment of an apparatus for dehumidifying air according to the invention, illustrated only by way of a non-limiting example in the accompanying drawings.

DESCRIPTION OF THE PREFERRED EMBODIMENTS OF THE INVENTION

Figure 1:
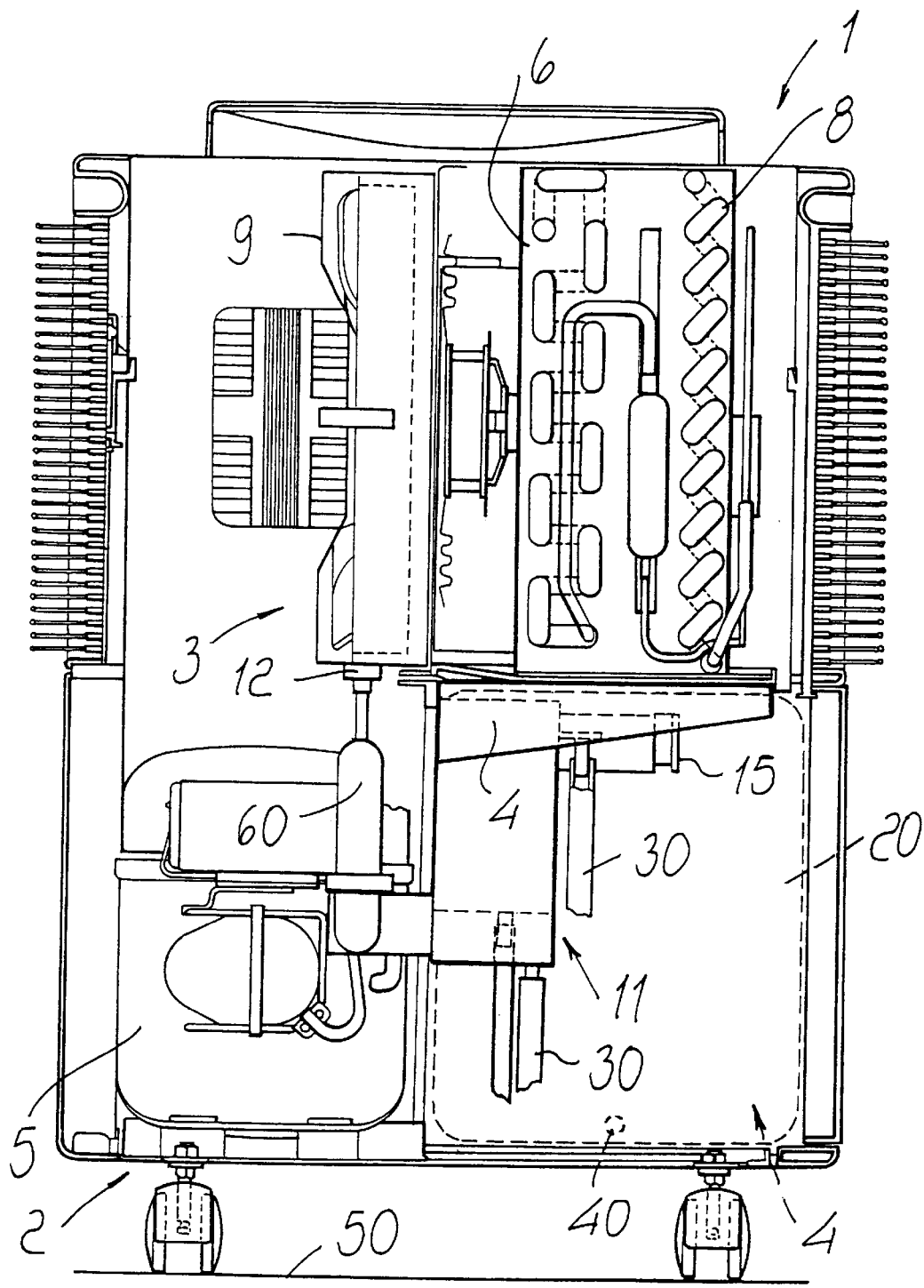
FIG. 1 is a side cross-section view of the apparatus according to the invention.
Figure 2:
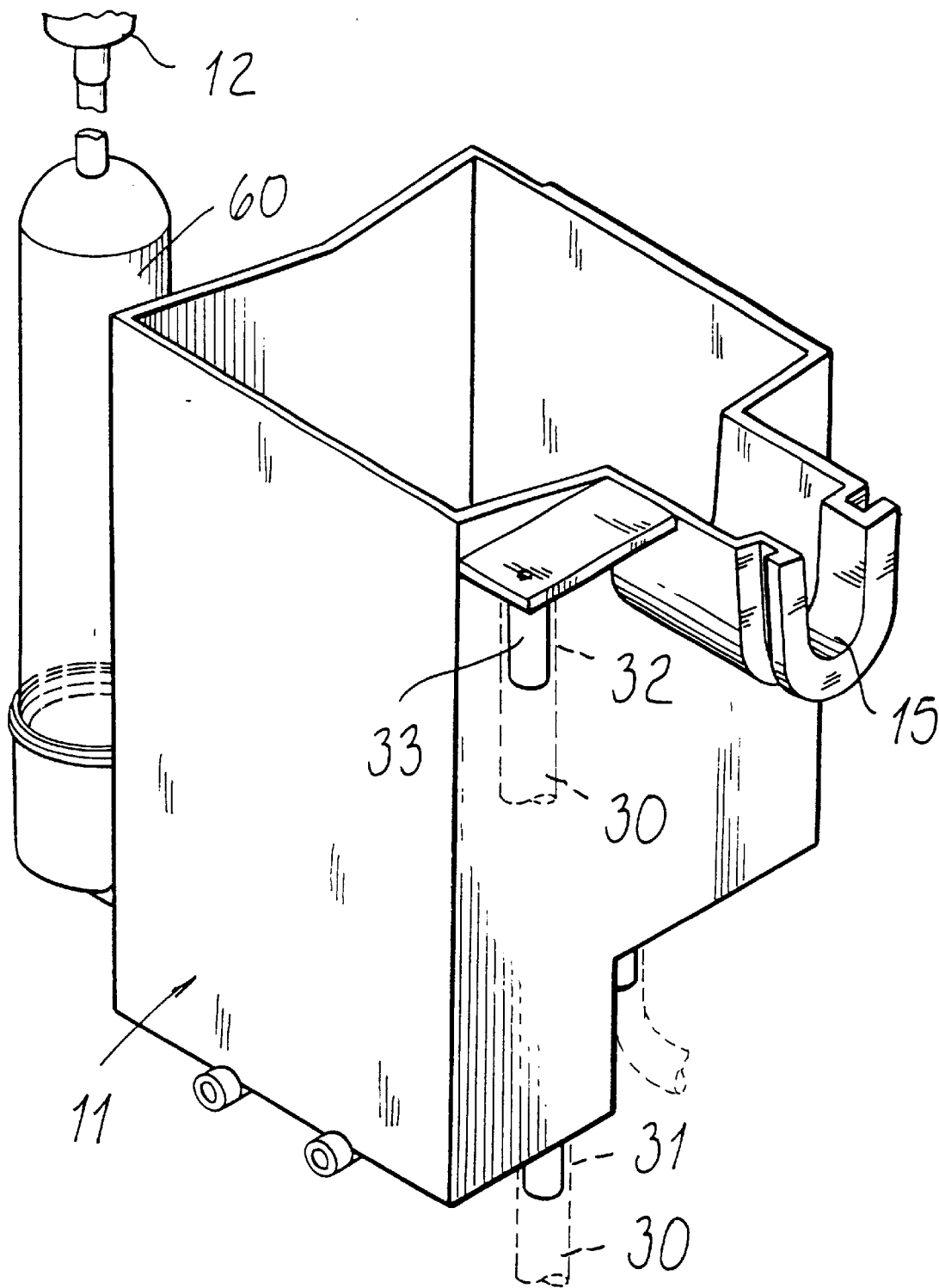
FIG. 2 is a perspective view of the tank provided in the apparatus according to the invention.
Figure 3:
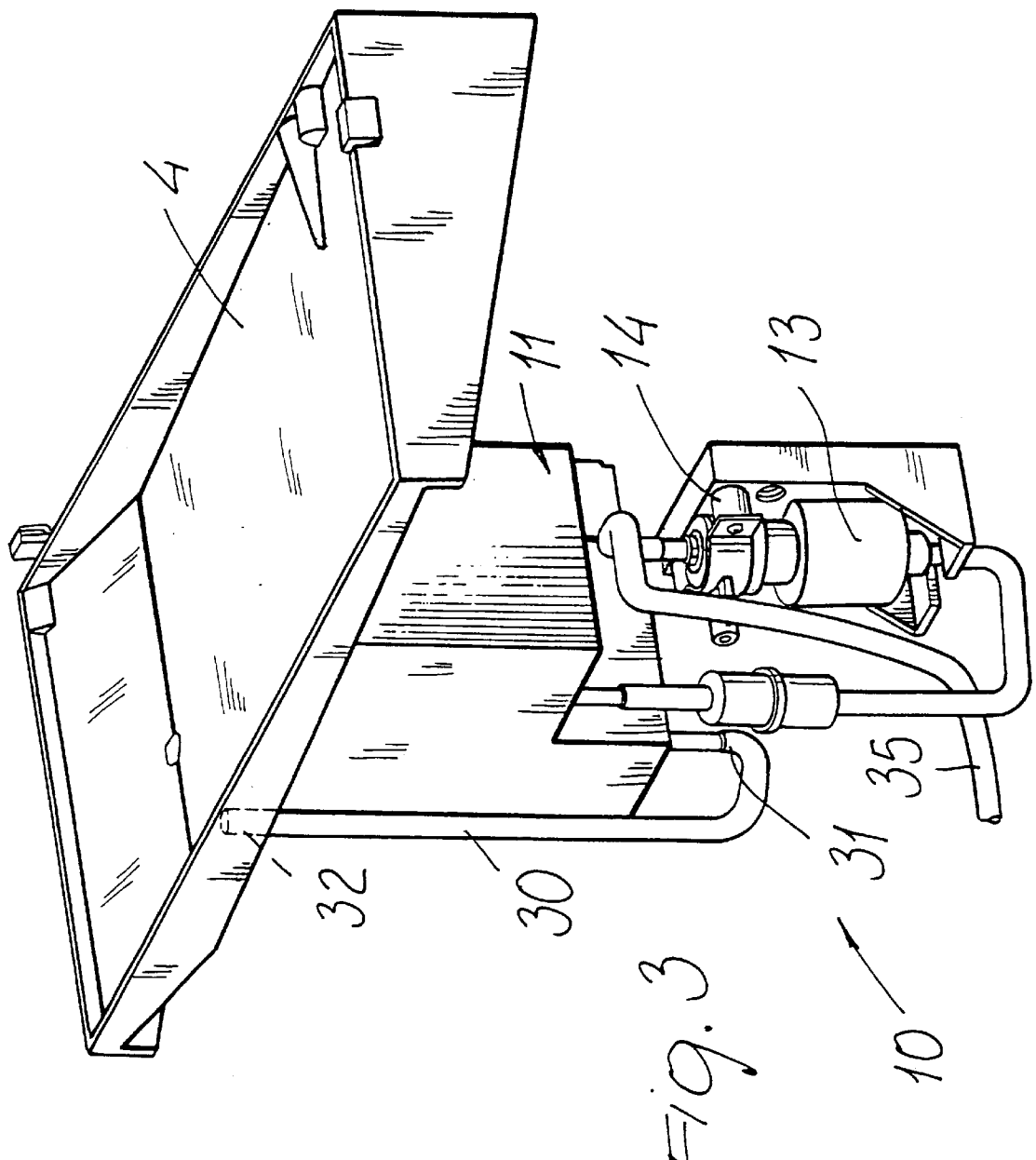
FIG. 3 shows the discharge means of the apparatus according to the invention.

With reference to the figures, the apparatus for dehumidifying air according to the invention, globally designated by the reference numeral 1, comprises a frame 2 supporting a dehumidifying means, globally designated by the reference numeral 3, for dehumidify air and collecting means, globally designated by the reference numeral 4, for collecting condensate generated while dehumidifying the air.

More particularly, the dehumidifying means comprises a compressor 5 adapted to compress a gas, such as for example the gas commercially known as Freon, which is thereby heated.

The heated gas reaches at least one condenser 6 and is condensed and cooled thereby delivering part of its heat to the surrounding air and liquefying.

That liquid, after going through a laminating means, partially turns into gas again and cools down.

The thus cooled down gas/liquid reaches at least one evaporator 8 and completely turns into a gas again.

The passage of ambient air through the evaporator, by means of a fan 9, generates a condensate that must be collected by means of the collecting means comprising at least one discharge means for discharging the condensate outside the frame of the dehumidifier.

The discharge means, globally designated by the reference numeral 10, comprises a tank 11 having at least one detector means, namely a pressure switch 12, connected to a bell pressure take-off 60 adapted to detect the presence of condensate inside the tank 11.

The tank 11 is further provided with an ejection means, namely a pump 13, adapted to eliminate the condensate from inside the tank 11.

Pump 13 is preferably a high head pump of the vibrating type and of low capacity and high pressure which is activated or deactivated both manually, by the operator, or automatically by the pressure switch when the pressure switch does not detect the presence of condensate inside the tank 11.

More particularly, when the dehumidifier is turned on, and if the pump 13 is activated, the pressure switch allows the activation of the pump only after detecting the presence of condensate in the tank.

If instead the pressure switch does not detect the presence of condensate in the tank 11, the pump cannot be activated thus preventing any damage to the pump.

Pump 13 is also conveniently associated with the frame of the dehumidifier through antivibration members 14.

In this manner, there is no transmission of vibrations to the frame even though the pump has a high head. The pump is also provided with safety means adapted to switch it off in case the delivery and/or intake ducts are clogged.

For example, the safety means, which is not illustrated, may be a thermostat or a pressure switch or a power detector adapted to deactivate the pump in case of detection of abnormal working parameters.

More particularly, the tank comprises an overfill member adapted to discharge the condensate into a container 20 arranged below the tank and removably associated with the frame of the dehumidifier.

The overfill member is defined by a conduit 15 provided in the upper portion of the tank 11 and connected to the container 20.

In this manner, in case of malfunction of the pump, for any reason, the condensate will be collected in the tank 11 up to the conduit 15 level and will automatically pass inside the container 20 which is conveniently provided with safety means adapted to deactivate the humidifier, and in particular the compressor and/or the pump 13, in case of malfunction of the pump.

In particular, the first safety means, not illustrated, may be defined by a floater hinged to the container 20 and having a rod adapted to control a switch in order to prevent the operation of the apparatus as well as to visualize the filling up of the container allowing the user to empty it.

The tank 11 is also provided with a tubular member 30 having a first end 31 associated with the bottom of the tank 11 and a second end 32 associated with a hook 33.

The tubular member 30 is inserted into the hook 33 in a manner such that its second end 32 is always in a position higher than the minimum level of conduit 15 for discharging the condensate from the container.

In this manner, if it is required to manually discharge the residual condensate from the tank 11, the tubular member 30 may be extracted from the hook 33 and its second end 32 may be arranged at a lower level than the firs end 31 thus allowing the condensate to exit by gravity.

The tank 11 is also provided with a drain 40 which can be easily opened by the user in order to drain the condensate by gravity from the tank.

The end of the delivery conduit 35 of pump 13 has a quick joint, not illustrated, outside the frame of the humidifier and a hose can automatically be fitted thereon to bring the condensate to a selected discharge area.

It has been seen above how the dehumidifier according to the invention may, while dehumidifying the air, discharge the condensate to a first, second and third level with respect to its base plane 50.

In particular, the first level is substantially lower than the base plane, the second level is substantially at the same height of the base plane, and in particular at the same height of the base plane of the container, and the third level is substantially higher than the base plane.

Therefore, besides allowing to discharge the condensate at any level, and therefore also when the dehumidifier is placed underground, all the discharge operations, at all three levels, are always under the control of the first safety means 20 associated with the container 20 which, as described above, is removably associated with the dehumidifier.

More particularly, the condensate discharge at the first level, i.e. at a lower level with respect to the base plane, comprises collecting the condensate into the pan 4, while dehumidifying the air, and transferring the condensate by gravity into the container 20 wherefrom, also by gravity, through the aperture 40 provided on the bottom of the container, the condensate is brought to the area selected by the user where the condensate is discharged continuously allowing a continuous operation of the dehumidifier.

In such case, the safety of the operation is always provided by the first safety means associated with the container and adapted to stop the operation of the dehumidifier, and particularly to stop the compressor, if the condensate reaches a selected level inside the container because of a clogging of the aperture 40 of the container.

The condensate discharge at the second level, i.e. at a level substantially at the same height of the base plane, comprises collecting the condensate into the pan 4, while dehumidifying the air, and transferring the condensate by gravity through the tank 11 into the container 20, where the first safety means stop the operation of the dehumidifier if the condensate reaches a preset level.

The condensate discharge at the third level, i.e. at a level which is just slightly or substantially higher than the base plane, comprises collecting the condensate into the pan 4, while dehumidifying the air, and transferring the condensate by gravity into the tank 11 which, as described above, is arranged above the pan and below the container 20.

Therefore, by means of the pump 13, the condensate can be discharged from the tank 11 with a discharge head of over 10 m.

Of course, the pump 13 is activated only if there is condensate in the tank 11 and if the intake and delivery conduits are free and unclogged.

In such case, the first safety means associated with the container, will stop the operation of the dehumidifier when the condensate leaking out of the tank 11 and into the container 20 through the conduit 15, because of any malfunction of the pump, reaches a level inside the container preset to activate the first safety means.

It has been seen in practice how the apparatus according to the invention is particularly convenient because of its high flexibility of use and because it can operate continuously without malfunctions even underground over 10 m below the condensate discharge point.

The dehumidifier is also adapted to operate with three different modes of operations as described above according to the user's need, always in absolute safety and with the same control system.

The presence of the tank 11 also allows a greater collecting capacity in case of conventional operation of the dehumidifier.

The apparatus according to the invention is susceptible to numerous modifications and variations, within the scope of the appendend claims. All the details may be replaced with other technically equivalent elements.

What is claimed is:

1. An apparatus for dehumidifying air comprising a frame, dehumidifying means on said frame for dehumidifying air, and collecting means on said frame for collecting condensate generated while dehumidifying the air, said collecting means comprising at least one discharge means for discharging said condensate and comprising a tank having at least one detector means adapted to detect the presence of condensate inside the tank and at least one ejection means for ejecting said condensate from said tank, said ejection means comprising a high head pump for discharging said condensate from said tank outside said frame at a level higher than that of said tank, said pump being a low capacity and high pressure vibration pump having anti-vibration members for avoiding transmission of vibrations and having safety means adapted to stop operation at least in case of clogging of a delivery or intake duct of the pump.

2. The apparatus according to claim 1 wherein said tank comprises an overflow means adapted to discharge said condensate inside a container removably associated with said frame.

3. The apparatus according to claim 2 wherein said overflow means comprises a conduit adapted to connect the upper portion of said tank with said container.

4. The apparatus according to claim 3 wherein said tank comprises a tubular member having a first end associated with the bottom of said tank for manually discharging any residual condensate, said tubular member being flexible and having a second end movable from a position above said level of said conduit to a position below the bottom of said tank.

5. The apparatus according to claim 4 wherein said tank is upwardly connected with a tilted pan adapted to collect said condensate from said dehumidifying means, and downwardly with said container, said container comprising first safety means for deactivating said apparatus and/or said pump in case of malfunction.

6. The apparatus according to claim 5 wherein the delivery conduit of said pump is provided with a quick connector means.

7. The apparatus according to claim 6 wherein said discharge means is associated with said container.

8. A process for operating a dehumidifying apparatus which comprises a dehumidifying means on a frame for dehumidifying air, a collecting means on the frame for collecting condensate generated during the dehumidifying of the air and a discharge means for discharging condensate outside the frame at a level at least higher than the height of the collecting means, said process comprising discharging said condensate to at least a first, a second and a third level with respect to the height of a base plane supporting said apparatus, said first level being substantially lower than said base plane, said second level being substantially at the same height of said base plane, said third level being substantially higher than said base plane.

9. The process according to claim 8 wherein the discharging of said condensate at at least said first, second and third levels are all controlled by at least a first safety means connected to a container collecting said condensate and removably associated with said apparatus.

10. The process according to claim 9 wherein the discharging at said first level comprises collecting the condensate into a pan, while dehumidifying the air, transferring the condensate by gravity into the container, discharging said condensate by gravity, through an aperture provided on the bottom of the container, said first safety means being associated with the container and being adapted to stop the operation of the dehumidifier if the condensate reaches a selected level inside the container because of a clogging of an aperture of the container.

11. The process according to claim 9 wherein the discharging at said second level comprises collecting the condensate into a pan while dehumidifying the air, and transferring the condensate by gravity into the container, said first safety means being adapted to stop the operation of the dehumidifing apparatus if the condensate reaches a preset level inside said container.

12. The process according to claim 9 wherein the discharging at said third level comprises collecting the condensate into a pan while dehumidifying the air, transferring the condensate by gravity into a tank arranged above the pan and below the container, draining said condensate by means of a pump from said tank only if said condensate is present in the tank and only if said condensate is free to flow in intake and delivery ducts of said pump, said first safety means associated with said container being adapted to stop the operation of the dehumidifier when the condensate leaking out of the tank reaches a preset level inside the container in case of malfunction of said pump.

* * * * *